Nov. 15, 1949                J. L. WORZEL                2,488,486
                             BOTTOM SAMPLER
                          Filed April 11, 1946
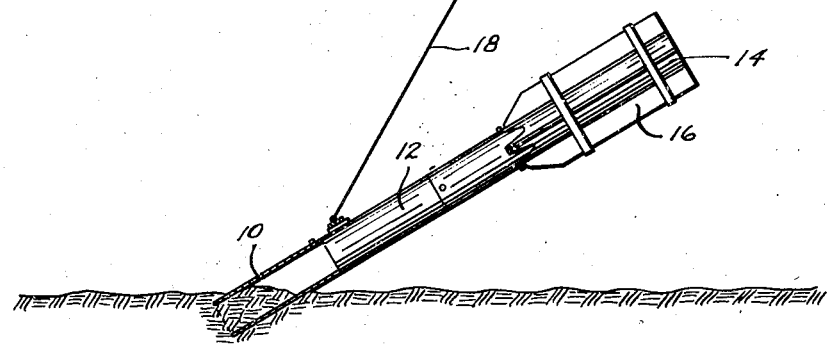
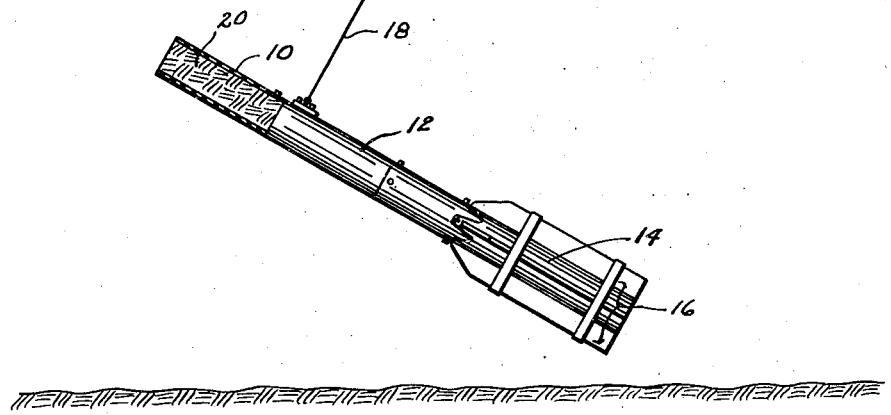
Inventor:
John L. Worzel
by M. A. Hayes
Attorney

UNITED STATES PATENT OFFICE 2,488,486

BOTTOM SAMPLER

John L. Worzel, Woods Hole, Mass., assignor to the United States of America as represented by the Secretary of the Navy Application April 11, 1946, Serial No. 661,181

5 Claims. (Cl. 255—1.4)

This invention relates to an instrument for obtaining samples of the surface layer of the ocean bottom. More specifically, the invention relates to an instrument for obtaining ocean bottom samples from ships either while anchored, hove to or underway.

In connection with submarine studies such as biology and geology, it has been found that small samples of the surface layer of the ocean bottom are very useful. In the past a ship had to be hove to or anchored while relatively heavy gear was lowered to the bottom and caused to take a sample. This was a tedious and difficult operation. Frequent stopping of the ship and resuming speed and course caused great difficulty in accurately locating the source of each sample.

An object of the invention therefore is to overcome the difficulties referred to and to devise an improved sampling tube. In this connection, I have found that by combining a sampling tube with a weight member and guide fins arranged in proper relative position to one another, it becomes possible to direct a sampling tube downwardly into the surface layer of the ocean bottom in a greatly improved manner. Moreover, I have found that the arrangement described lends itself very well to the use of a hitch line by means of which the sampling tube may be drawn upwardly with the filled end of the sampling tube assuming an elevated position, thus avoiding loss of the sample.

The sampling tube of the invention therefore comprises a light tubular element which falls rapidly to bottom and which may be quickly recovered regardless of whether the ship from which it may be cast is anchored, hove to, or underway. Hence a ship need not alter its course or speed while the sample is being taken. The location of the source of the sample is much more accurately known.

In the accompanying drawings:

Fig. 1 is a diagrammatic view illustrating the sampling tube of the invention in the position it assumes at the moment of taking a sample of the surface layer of the ocean bottom; and Fig. 2 is another diagrammatic view illustrating the sampling tube as it starts to ascend.

The instrument illustrated in the drawings constitutes a preferred form of the invention and includes a sampling tube attached to a weight member in such a manner that guide fins may be used to guide the tube to the bottom in a proper position to scoop up a sample of the ocean bottom; the fins then guide the tube back to the surface in such a position that the sample is retained.

Considering the structure shown in greater detail, 10 denotes a sampling tube which is preferably constructed of a metal such as brass and which is open at the forward end. Attached to the opposite end of the sampling tube 10 is a weight member 12 which may be of cylindrical shape generally corresponding to the shape of the sampling tube. The weight may be secured in any desired manner as by being fitted within the sampling tube and then pinned, or in various other ways. While this weight member may have various shapes and sizes, good results have been obtained using a size of weight member which slightly exceeds in length the sampling tube as shown in the drawings.

At the rear extremity of the weight member 12 is firmly secured a tubular member 14 which carries along its outer periphery, in spaced relation, a plurality of longitudinally extending guide fins 16. The fins consist of thin metal strips which are of sufficient length to provide a relatively large surface area for steering or guiding the tube and weight member through sea water.

A final important element consists in a hitch line 18 which is attached to the weight member at a point adjacent to the forward end of this member in the position indicated in the drawing.

A novel feature of the invention is the particular arrangement of weight, hitch line and guide fins with a sampling tube since by the assembly noted, the tube when allowed to fall freely, tends to assume a sharply inclined position so that the open end of the sampling tube first comes into contact with the ocean bottom. A further important aspect of the invention consists in the fact that a very appreciable force of momentum develops, sufficient to cause the open end of the tube to be driven sharply into the ocean bottom, thus scooping up an appreciable sample of the ocean bottom. The hitch line cooperates with the other elements in keeping the tube in a correct diving position especially when operated from a moving ship since some pull is exerted which tends to maintain the tube in an angular position moving ahead in the direction of the pull. When the tube is pulled up, the weight member causes the tube to fall back away from the hitch line in the manner shown in Fig. 2. This prevents the sample material 20 in the sampling tube from being lost. At the same time the tube can be so rapidly recovered that the general locality from which the sample was secured can be readily determined.

Although in accordance with the provisions of the patent statutes this invention is described as embodied in concrete form and the principle thereof has been explained together with the best mode with which it is now contemplated applying that principle, it will be understood that the apparatus shown and described is merely illustrative and that the invention is not limited thereto since alterations and modifications will readily suggest themselves to persons skilled in the art without departing from the true spirit of the invention or from the scope of the annexed claims.

I claim:

1. A sampling tube for obtaining samples of the surface layer of earth under water comprising, a hollow, tubular sampling member, a cylindrical weight member and a relatively light cylindrical supporting member, said three members being disposed in collinear relationship with said weight member intermediate said other two members, guide fins secured to said supporting member and a hitch line secured to the end of said weight member adjacent to said sampling member.

2. A sampling device for obtaining samples of the earth under water comprising a cylindrical member having a hollow sampling member at a first end thereof to receive a quantity of said earth, guide fins secured to the other end of cylindrical member and a hitch line secured to said cylindrical member at a point nearer said first end than the center of gravity of said sampling device with a predetermined quantity of earth in said sampling member.

3. A sampling device for obtaining samples of the earth under water comprising an elongated member having a sampling opening formed in one end thereof, guide fins secured to the other end of said member, and a hitch line secured to said member at a point spaced from said end and nearer said end than the center of gravity of said member.

4. A sampling tube for obtaining samples of the surface layer of earth underwater, comprising a cylindrical member formed with a sampling chamber at a first end thereof, said sampling chamber being adapted to receive a quantity of said earth, guide fins secured to said cylindrical member at a second end thereof and disposed substantially parallel to the axis of said cylindrical member, and a hitch line attached to said cylindrical member, the point of attachment of said hitch line being spaced from said first end and nearer said first end of said cylindrical member than the center of gravity of said sampling tube with said earth in said sampling chamber.

5. A sampling device for obtaining samples of the earth underwater comprising a substantially straight, elongated member having a sampling opening formed in a first end thereof, guide fins secured to the other end of said member, said guide fins and said sampling opening being disposed on opposite sides of the center of gravity of said device when said opening is free of said earth, and a hitch line secured to said member at a point spaced from said first end and nearer said first end than the center of gravity of said device with a predetermined quantity of earth in said sampling opening.

JOHN L. WORZEL.

REFERENCES CITED

The following references are of record in the file of this patent:

UNITED STATES PATENTS

| Number | Name | Date |
|---|---|---|
| 598,725 | Currie | Feb. 8, 1898 |
| 1,410,904 | Fitzpatrick | Mar. 28, 1922 |

OTHER REFERENCES

Knight's American Mechanical Dictionary, volume III, page 2249, Figure 5326, published 1877.